UNITED STATES PATENT OFFICE.

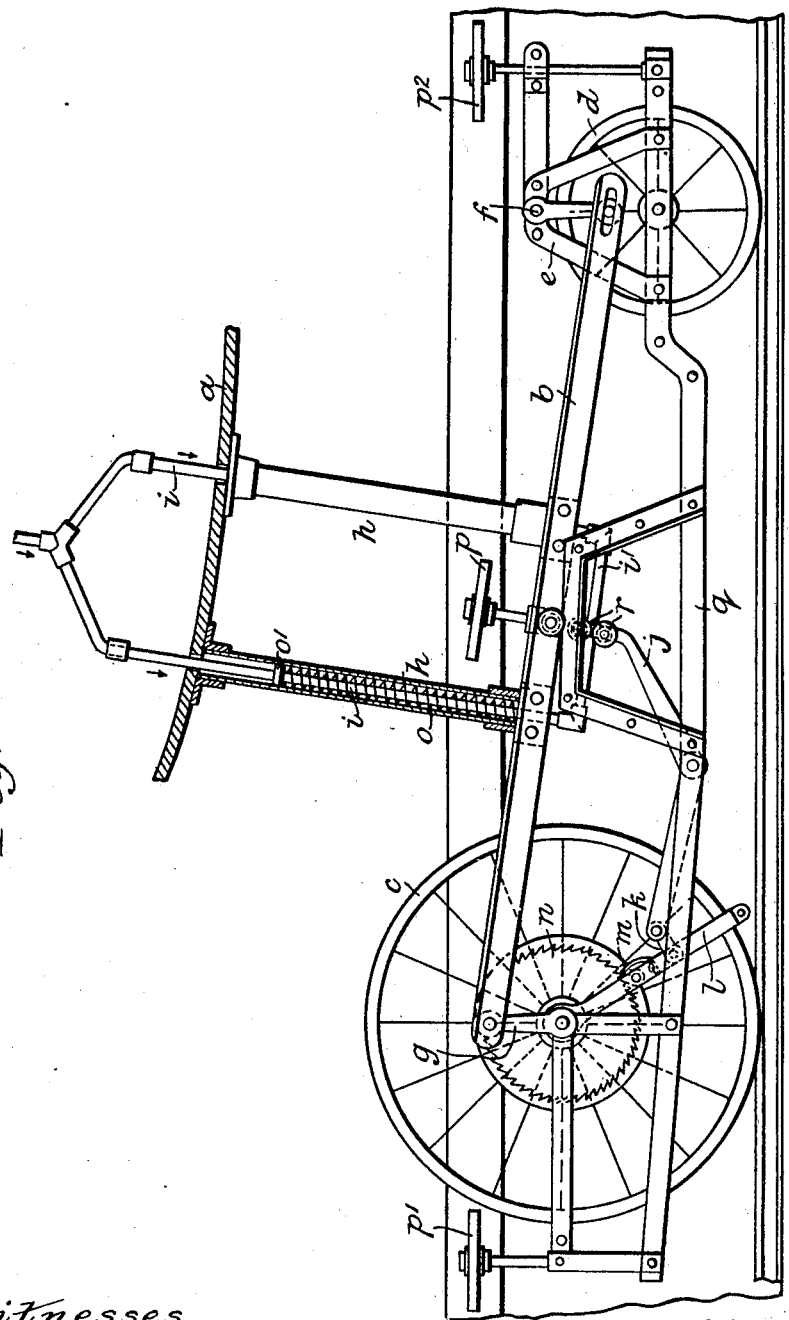

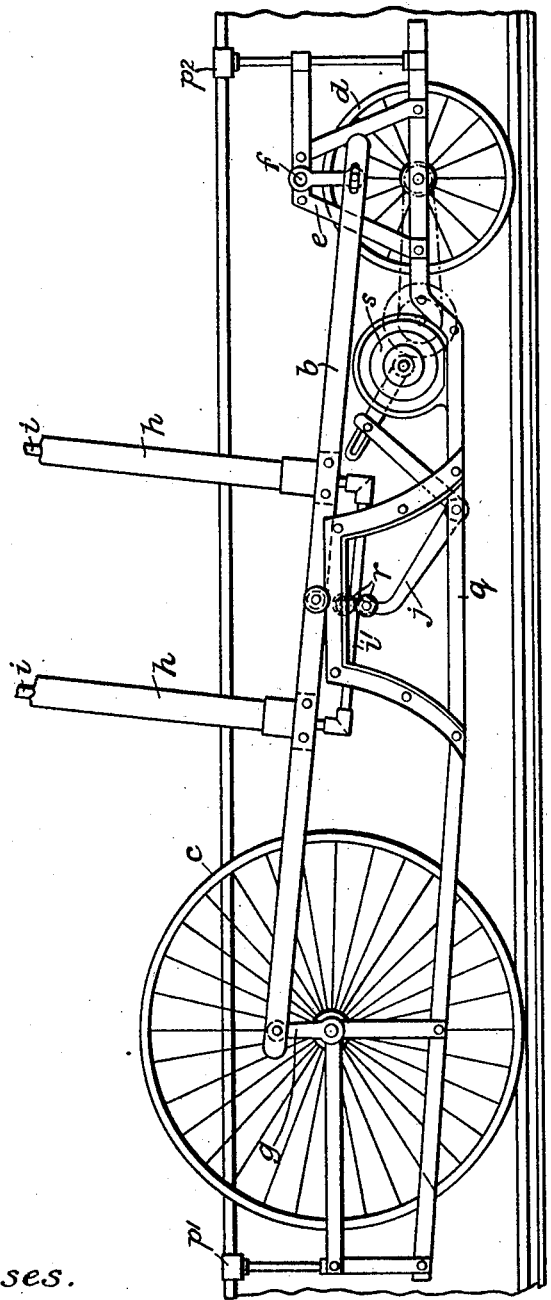

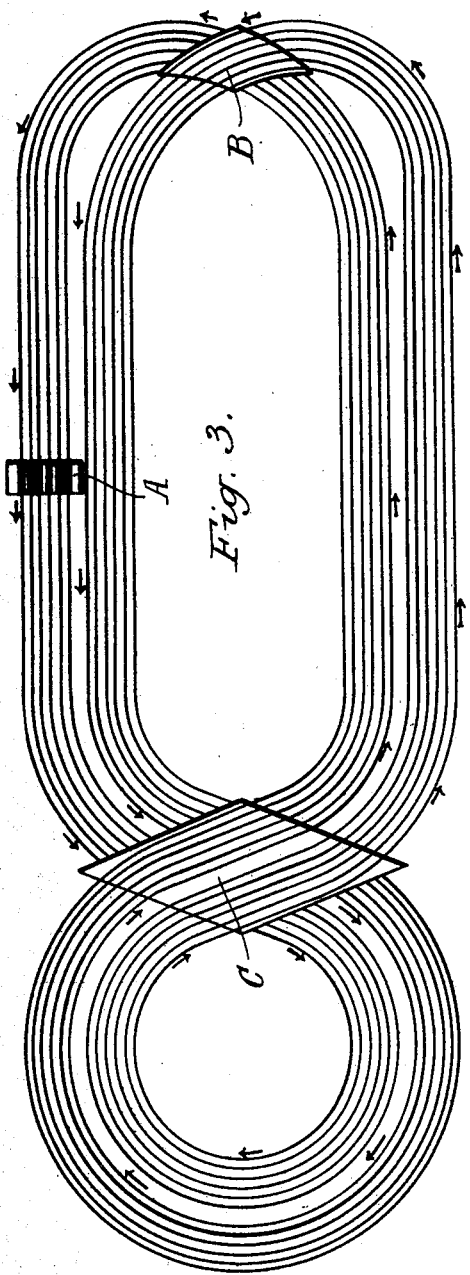
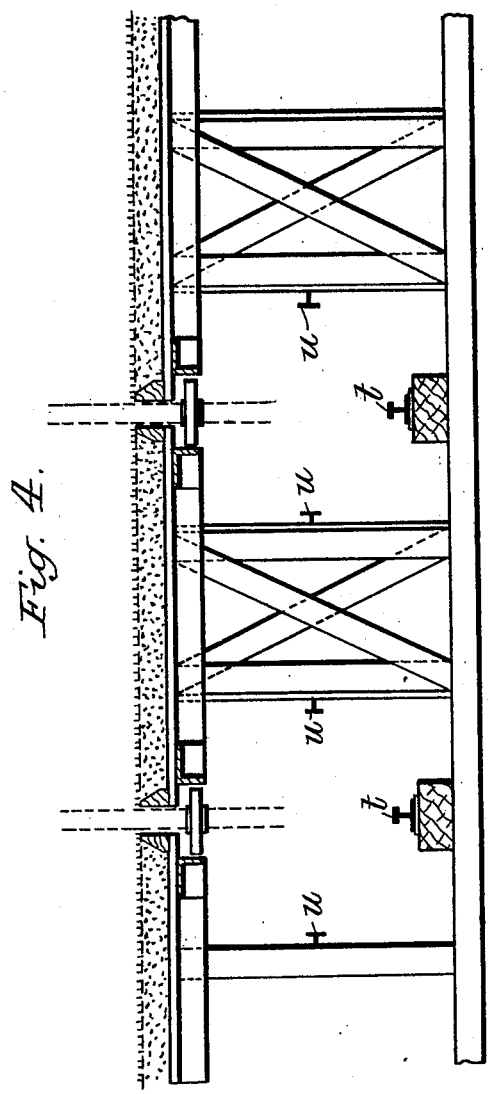

THOMAS WILLIAM POTTS, OF LONDON, ENGLAND.

AMUSEMENT APPARATUS.

No. 916,590.  Specification of Letters Patent.  Patented March 30, 1909.

Application filed March 16, 1908. Serial No. 421,354.

*To all whom it may concern:*

Be it known that I, THOMAS WILLIAM POTTS, a subject of the King of Great Britain and Ireland, residing at 30 Chesilton road, Fulham, London, England, have invented certain new and useful Improvements in Amusement Apparatus; and I do hereby declare the following to be a full, clear, and exact description of the invention, such as will enable others skilled in the art to which it appertains to make and use the same.

This invention for improvements in velocipede or similar horses for recreation or amusement relates to horses of the type in which the horse is connected to the wheels in such a manner that a rising and falling motion is imparted to the horse, and the speed may be accelerated by the movement of the rider, and has for its object to enable such horses to travel on a single rail track.

According to this invention the horse is mounted on a rocking bar or frame, mounted on cranks connected to or supported by leading and trailing wheels, adapted to run on a mono-rail preferably laid below the surface of the ground in the bottom of a groove and guided in a suitable manner.

In the accompanying drawings Figure 1 is a side elevation of the trolley or running gear on which the mechanical horse is mounted, Fig. 2 is a similar view to Fig. 1, showing a slightly modified form of gear, Fig. 3 is a diagram of the track or railway on which the horses are intended to run, and Fig. 4 is a transverse section on a larger scale through the track conduits.

The horse which is only partly shown at $a$ is mounted on a frame $b$ supported between a track wheel $c$ of comparatively large diameter, and a smaller wheel $d$. The smaller wheel $d$ supports a frame or bracket $e$ on which a crank shaft $f$ is mounted to rotate, while the large wheel has a crank axle $g$ fixed therein, so as to be driven by the wheel $c$.

The supporting frame $b$ is constructed of two longitudinal side members with distance pieces between them and the ends of the side members are connected to the cranks of the shaft $f$ and axle $g$ in such a manner that as the wheels travel along the track the connecting bar or frame $b$ has a rocking motion imparted to it being actuated from the axle of the leading track wheel. The frame $b$ and the smaller wheel are inclosed in the groove or conduit hereinafter described in which the track is laid.

Above the surface of the ground but as near thereto as possible I support the horse by means of pillars or tubes $h$ fixed at their upper ends in the body $a$ of the horse, and at their lower ends which pass into the track groove, to the rocking bar $b$.

In order that the rider may assist in propelling the horse the saddle is connected with the large track wheel $c$ through a plunger frame $i$, crank lever $j$, connecting link $k$ and fork $l$ which is pivotally supported on the axle $g$ and carries on each arm a pawl $m$ engaging with a ratchet $n$ on the hub of the wheel $c$. The lever $j$ is fulcrumed on a frame $q$ suspended between the track wheels and carries grooved rollers $r$ which couple the lever to the lower bar $i'$ of the plunger frame $i$ enabling the vertical component of the movement of the plunger frame produced by the rider depressing the saddle to be fully utilized for assisting the propulsion. Springs $o$ located in the tubes $h$ bear against the collars $o'$ on the plunger frame $i$ and raise the saddle after each depression.

A guide wheel $p$ is mounted on the frame $b$ which supports the horse and bears against the sides of the groove at the top of the conduit to keep the horse upright. Guide wheels $p'$ $p^2$ are also arranged at the front and rear ends of the trolley.

In the modified form of construction shown in Fig. 2 the pawl and ratchet mechanism is replaced by an electric motor $s$ in which the speed is adapted to be varied by introducing more or less of a resistance or by altering the reluctance of the field magnet system. The speed varying device of whatever type, is operatively connected with the lever $j'$ which corresponds to the lever $j$ in Fig. 1 and is similarly actuated by depressing the saddle. Thus the rider by his own exertions can accelerate the speed and mechanical horse racing is made possible.

The track with which my invention is used is preferably laid in the form shown in plan in Fig. 3 in which each line represents a conduit. By this arrangement the distances to be traversed by each horse covering the complete course are approximately equal. If A be the starting platform the course taken by each horse from start to finish is indicated by the arrows. Bridges are constructed at the points of intersection of the tracks B. C.

Any suitable construction of conduit for the rail *t* may be adopted. As shown in Fig. 4 the conduit is fitted with rails *u* through which current is supplied from any suitable source to the motor *s*.

What I claim as my invention and desire to secure by Letters Patent is:—

1. An amusement apparatus comprising in combination, a single track truck provided with wheels, a horse supporting frame mounted on and oscillated by said truck, and means operated solely by movement of the rider for propelling said truck.

2. An amusement apparatus comprising in combination, a truck provided with wheels, a horse supporting frame mounted on and oscillated by said truck, and means operated solely by movement of the rider for propelling said truck.

3. An amusement apparatus comprising in combination, a single track truck provided with wheels, a horse supporting frame mounted on said truck, and means operated solely by bodily movement of the rider for propelling said truck.

4. An amusement apparatus comprising in combination, a single track truck provided with wheels, means for maintaining said truck in an upright position, a horse supporting frame mounted on and operated by said truck, and means operated solely by bodily movement of the rider for propelling said truck at different rates of speed.

5. An amusement apparatus comprising in combination, a single track truck provided with wheels, a horse supporting frame mounted on and oscillated by said truck, and means adapted for connection with a horse saddle for propelling said truck solely by bodily movement of the rider.

6. An amusement apparatus comprising in combination, a single track truck provided with wheels, a horse supporting frame mounted on and oscillated by said truck, and yieldingly acting means adapted for connection with the saddle of the horse and operated solely by bodily movement of the rider for propelling said truck.

7. An amusement apparatus comprising in combination, a single track truck provided with a driving and trailer wheel, a horse supporting frame movably mounted on said truck and oscillated by said driving wheel, and means connected with said driving wheel and operated solely by bodily movement of the rider for propelling said truck.

8. An amusement apparatus comprising in combination, a single track truck provided with a driving and a trailer wheel, a centrally disposed frame supporting member for said truck, a crank for one end of said truck and a crank connected with said driving wheel, a horse supporting frame movably mounted on said member and connected with said crank, and means including a ball and ratchet wheel operated solely by bodily movement of the rider for propelling the truck.

9. An amusement apparatus comprising in combination, a single track truck provided with a propelling and a trailing wheel, an axle for said propelling wheel provided with a crank and a ratchet wheel, an idler crank for said truck, a centrally disposed supporting member for said truck, means for maintaining said truck in an upright position, a horse supporting frame provided with a roller movable on said member, said frame being connected with said idler crank and axle crank and oscillated by the latter, a hollow support extending upwardly from said frame for supporting the horse, a pawl device operatively engaging said ratchet wheel, means extending through said support and adapted for connection with the saddle for operation by bodily movement of the rider, and a roller connection between said means and said pawl device substantially as described.

In testimony whereof I have affixed my signature, in presence of two witnesses.

THOMAS WILLIAM POTTS.

Witnesses:
JOHN W. MACKENZIE,
ALBERT JONES.